(No Model.) 2 Sheets—Sheet 1.

C. F. BRUSH.
SECONDARY BATTERY.

No. 276,155. Patented Apr. 24, 1883.

*Case B.*

WITNESSES
W. Engel
Jno. Crowell Jr

Charles F. Brush INVENTOR
By Liggett & Liggett
ATTORNEYS (No Model.) 2 Sheets—Sheet 2.

C. F. BRUSH.
SECONDARY BATTERY.

No. 276,155. Patented Apr. 24, 1883.

UNITED STATES PATENT OFFICE.

CHARLES F. BRUSH, OF CLEVELAND, OHIO.

SECONDARY BATTERY.

SPECIFICATION forming part of Letters Patent No. 276,155, dated April 24, 1883.

Application filed June 9, 1881. (No model.)

*To all whom it may concern:*

Be it known that I, CHARLES F. BRUSH, of Cleveland, in the county of Cuyahoga and State of Ohio, have invented certain new and useful Improvements in Secondary Batteries; and I do hereby declare the following to be a full, clear, and exact description of the invention, such as will enable others skilled in the art to which it pertains to make and use it, reference being had to the accompanying drawings, which form part of this specification.

My invention, which, for reference and distinction from other similar inventions covered by applications for Letters Patent filed at the same time herewith, I shall distinguish as "Case B," relates to secondary batteries or apparatus for the absorption of electric energy and subsequent exhibition of the same; and it consists in an improvement in secondary batteries, and in the method or process of making the elements or electrodes of said batteries, as will hereinafter be particularly described and claimed.

Figure 1:
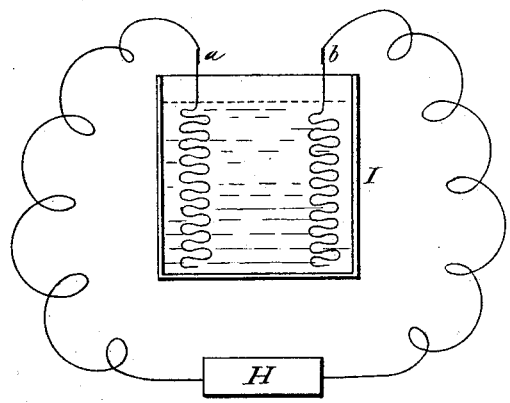
Figure 3:
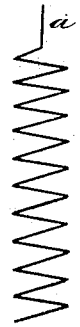
Figure 2:
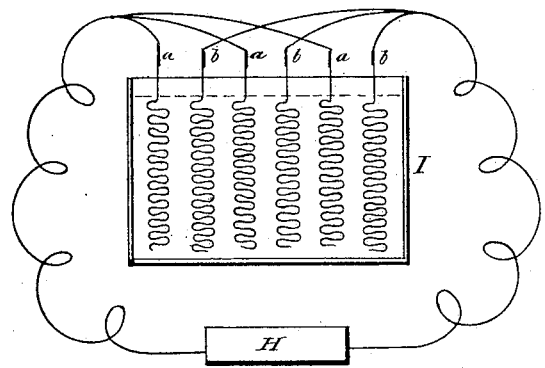
Figure 4:
Figure 5:
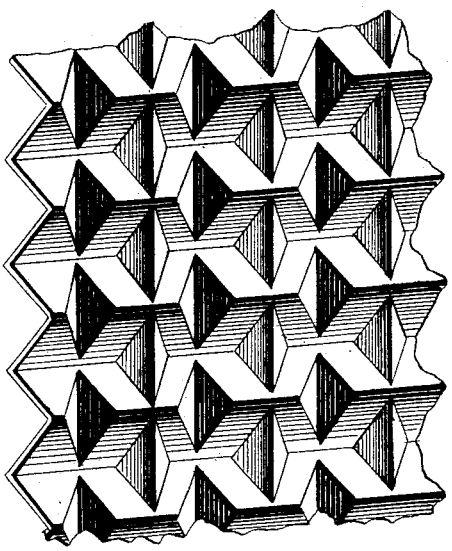

In the drawings, Figure 1 shows in edge view a single pair of corrugated, crimped, or folded plates immersed in a bath of dilute sulphuric acid or other suitable equivalent battery-fluid. The plates in this figure are shown as connected with a dynamo-electric machine or other current-generating device for "forming" them, or for charging them when formed. The same drawing would correctly represent a battery and its discharging-circuit, H in that case being an electromotor, lamp, or other translating device. Fig. 2 shows several plates or elements grouped and connected so as to present both of their sides for action. They are shown in a bath and connected the same as already remarked of the plates in Fig. 1. Fig. 3 shows in edge view an angularly corrugated or folded plate. Fig. 4 is an edge view, showing bent or corrugated plates associated together in such a manner that the elevations of one will enter the depressions of the other. Fig. 5 represents a plate or element bent or corrugated in two directions.

By the arrangement shown in Fig. 2 large surfaces may be contained within a small space, and both sides of each plate, except the end ones, are exposed directly for action. When the plates of secondary batteries are separately prepared by the electrical process known as "forming," or are otherwise provided with an active coating, they cannot afterward, without injury to their coatings, be rolled up into the cylindrical spiral form, or otherwise bent, as is customary for the sake of economy of the space occupied by battery-plates, or when previously bent into the cylindrical spiral shape, be separately formed or otherwise prepared for secondary-battery use; but by corrugating, crimping, or folding the plates in one or more directions, as I have above described, large surfaces, separately formed or otherwise provided with an active or absorbing coating or substance, may be associated together within a small space. This compactness of arrangement of large surfaces is one of the objects, although not the principal one, sought in my invention. During the oxidation and subsequent reduction that attends the forming process, and that also attends the regular charging and discharging of secondary batteries of the present type in normal use, the active coating on the battery-plate expands and contracts, and this occurring upon extended surfaces results in a blistering or peeling of the active coating from off the plate, rendering it worthless, for, in the type of battery to which my invention relates and is especially and essentially adapted, the active coating is designed to remain permanently attached to its electro-conducting body or support. In such a battery the elements are associated either in pairs or groups, (see Figs. 1 and 2,) and are immersed in a bath of dilute sulphuric acid, or other equivalent battery-fluid in which the active coating of the elements is insoluble. When a charging-current is passed through such a battery hydrogen is occluded by one of the elements and oxygen by the other. The surface of the oxygen element, if it is made from lead, as I prefer, will, when charged, be peroxidized. As the battery discharges the occluded hydrogen is liberated from the hydrogen element and oxygen is liberated from the oxygen element, the peroxidized coating of the said oxygen element being thereby reduced to a lower state of oxidation.

There is an expansion and contraction of the active coating of the elements, respectively, attending the charging and discharging of the battery just referred to, which is liable to result in causing the active coating to blister and peel off from its support, and thus destroy the element by interfering with the permanency and integrity of its active coating.

From the above description the type of battery to which my invention essentially relates will be clearly distinguished from that type wherein naked or uncoated plates of platinum or equivalent substance are immersed in a battery-fluid consisting of a solution of lead. Such a battery is described in United States Patent No. 31,545, granted February 26, 1861, to Charles Kirchhof. In this type of battery, which, if of any practical value, is necessarily one of very limited capacity, when the charging-current is passed through it lead is deposited upon the plates, and as the battery discharges this deposited lead is redissolved back into the battery-fluid. Thus with every successive charging and discharging of such a battery the elements are alternately provided with and deprived of their coatings. The essential requirements of such a type of battery preclude the idea of a permanent active coating of any kind for the plates or elements; and if the plates of a battery of the Kirchhof type be bent or corrugated, the only use subserved or object sought by such a construction would merely be economy of space occupied, for there would not exist in such a battery the liability or objection to the disturbance or destruction of the permanency of the active coating that constitutes so essential a desideratum in the type of battery to which my invention necessarily refers.

It will readily appear that the evils referred to resulting from the expansion and contraction of the essentially permanent active coating of the elements of a secondary battery of my type are largely mitigated or overcome by the use of my corrugated or folded plates, which serve as the electro-conducting body or support for said active coating. These plates, as shown in Figs. 1 and 2, being everywhere curved in one plane, at least, (they may also be bent or corrugated in two or more directions, if desired,) the expansion and contraction of the coating thereon is sufficiently accommodated by being evenly distributed to prevent disintegration; whereas in the case of large flat surfaces the accumulated expansion or contraction of considerable areas may find relief at comparatively few points only, thus causing disruption or peeling at these places.

In the case of angular corrugation, as shown in Fig. 3, the expansion or contraction of the coating on the narrow flat portions thereof finds sufficiently frequent relief at the angles to prevent mischief. The thickness of the corrugated plates must evidently be everywhere sufficient to provide enough metal for stability and electric conduction after the thickest attainable coating thereon shall have been "formed"—that is, if the electrical process known as "forming" be the one employed for producing the active coating. I do not, however, limit myself to any particular process of placing or producing an active or absorbing coating or substance upon my corrugated plates. Any effective method may be employed; but when the active coating is to be produced directly by electrical action on the plates themselves, I prefer to subject each plate separately to long-continued electrical oxidizing action, until the desired amount of active coating is formed thereon, and then reduce the coating by inverse electrical action on such of the plates as are intended to constitute hydrogen elements. This mode of procedure almost entirely prevents disintegration or peeling of the coatings, which, even with corrugated plates, is liable to occur when the coatings are formed in the manner customary heretofore—that is, by frequent reversals of the electric current through the plates during the forming process.

The operation of a secondary battery constructed according to my invention may be generally and briefly described as follows, and in the description reference may be had to Figs. 1 and 2 of the drawings, as illustrating both the charging and the discharging of the battery, as well as the forming of the plates, as heretofore referred to.

I will assume at the outstart that the plates $a$ $b$ have been provided in any effective manner with their active coatings, and that the coatings consist of lead in suitable condition. These coated plates are immersed in a bath consisting of dilute sulphuric acid or equivalent battery-fluid that will not dissolve the active coatings. A single pair of plates, as shown in Fig. 1, may occupy a battery-cell; or groups of plates, as shown in Fig. 2, may be contained in one cell, and associated and connected in the manner shown, so that both sides of every plate, except the end ones, will be exposed for action.

In charging the battery, a suitable current-generator, H, is placed in the circuit, and its current passed for a sufficient length of time through the battery. This results in hydrogen being absorbed by one of the elements and oxygen by the other. When the battery is charged the coating of the hydrogen-plate will be found to consist of metallic lead, while that of the oxygen element will consist of peroxide of lead. During the charging process there has been an expansion of the active coating, which expansion has been accommodated and relieved, so as to prevent mischief to the coating, by the folded or corrugated construction of the supporting-plates $a$ $b$.

In referring to the discharging of the battery, we may again refer to Figs. 1 and 2, and consider H as representing an electric lamp, motor, or other translating device located in the discharging-circuit of the battery. The direction of the discharging-current will be the reverse of that of the current employed to charge the battery. In discharging, the hydrogen element gives up its hydrogen and the oxygen element its oxygen, the surface or coating of the hydrogen element still remaining, as it always does, in the condition of metallic lead, while the surface or coating of the oxygen element is reduced from its peroxidized condition to a state of lower oxidation merely. In this operation of discharging there is a contraction of the active coating, which contraction is accommodated and relieved and prevented from doing mischief by the corrugated or folded construction of the supporting-plates, as already mentioned.

Having fully described my invention, what I claim as new, and desire to secure by Letters Patent, is—

1. In a secondary battery, one or more corrugated plates having a permanent active coating, substantially as set forth.

2. In a secondary battery, one or more corrugated plates having a permanent active coating electrically produced thereon, substantially as set forth.

3. In a secondary battery, two or more plates or elements each having depressions and elevations, the elevations of one entering the depressions of the other, substantially as set forth.

4. In a secondary battery, two or more corrugated plates or elements having their folds or corrugations entering each other, substantially as set forth.

5. A method of forming the elements of a secondary battery, consisting in constructing the body or support of the elements with corrugated surfaces, applying or producing on said surfaces an active coating, and afterward associating said elements together to form the battery, substantially as set forth.

6. A secondary-battery element consisting of a body, core, or support in the form of a flat sheet bent into a series of corrugations and provided with an active or absorbing coating, substantially as shown.

In testimony whereof I have signed my name to this specification in the presence of two subscribing witnesses.

CHARLES F. BRUSH.

Witnesses:
 JNO. CROWELL, Jr.,
 ERNEST O. ORSBURN.